D. BEARD.
Axle and Hub.
No. 23,148.
Patented Mar. 8. 1859.
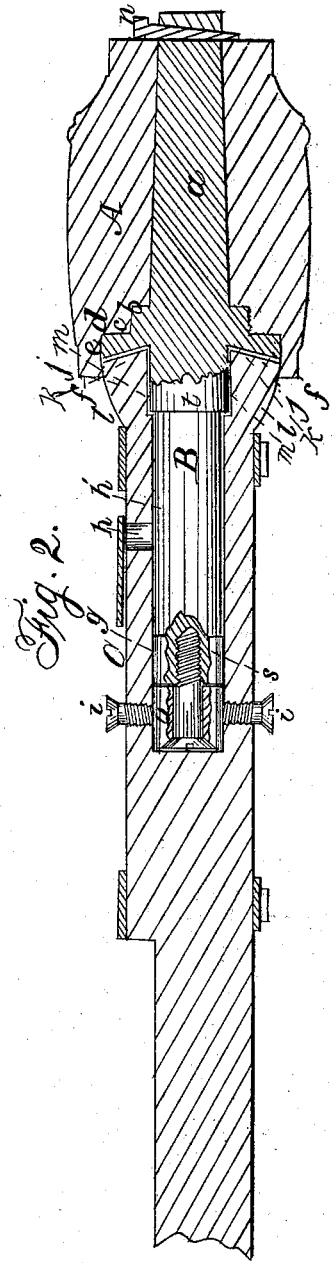
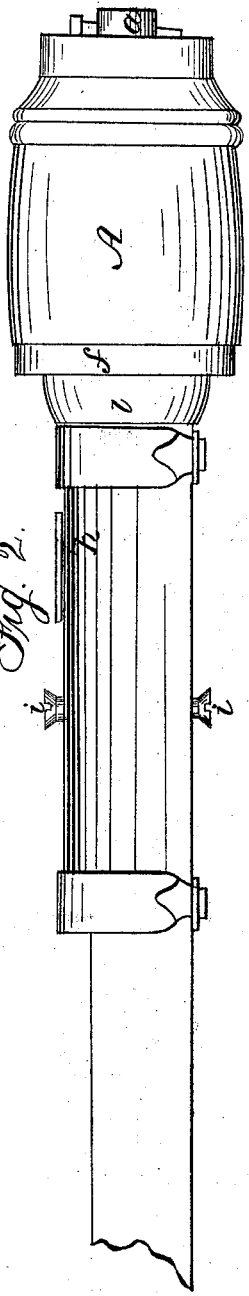
Witnesses;
H. H. Young
G. Cooke
Inventor;
David Beard

UNITED STATES PATENT OFFICE.

DAVID BEARD, OF SHIPPENSBURG, PENNSYLVANIA.

CONNECTING HUBS AND AXLES OF VEHICLES.

Specification of Letters Patent No. 23,148, dated March 8, 1859.

*To all whom it may concern:*

Be it known that I, DAVID BEARD, of Shippensburg, in the county of Cumberland and State of Pennsylvania, have invented a new and useful Improvement in Carriage Axles and Hubs; and I do hereby declare that the following is a full, clear, and exact description of the same, reference being had to the accompanying drawings, forming a part of this specification, in which—

Figure 1, is a side elevation of my improvement, and Fig. 2, is a vertical central section of the same.

Similar letters of reference, in each of the several figures indicate corresponding parts.

My invention relates exclusively to compound axles.

The object of my invention is to lessen the liability of the axle bending or breaking at the shoulder.

The nature of my invention consists in a peculiar manner of effecting a combination of the hub, short auxiliary axles and intermediate stationary axle; whereby internal auxiliary bearings for the short axle and an external main bearing for the hub are provided, in such a manner that friction is avoided and, also, what is more important, the axle is greatly relieved of the strain consequent, a sudden lateral inclination being given to the carriage; and whereby the surface of the bearing for the hub, and the thickness or diameter of the shoulder of the axle may be enlarged to suit different sizes and characters of wheels by the addition of a very small amount of metal, and thus a solid effective bearing, and an axle, which will resist great strain, and at the same time is not clumsy or unsystematical in appearance, is obtained.

My invention consists 2nd. In making the end of the main axle convex and the main bearing in the inner end of the hub concave, in the manner hereinafter described, whereby the lubricating material is more effectually kept, or retained longer at the points requiring to be lubricated, and thus waste avoided, as it will be almost entirely used up before it escapes.

To enable others, skilled in the art, to make and use my invention, I will proceed to describe its construction and operation.

A, represents the hub. B, the auxiliary axle, C, the main axle.

The auxiliary axle is made with a small taper shank $a$, which runs from a square shoulder $b$, of the axle to and beyond the outer end of the hub. The shoulder $b$, is fitted in a recess $c$, formed in the inner end of the hub, and has a circular shoulder $d$, formed on it, which fits into another recess $e$, of larger diameter formed in the hub. The recess $c$, is much deeper than the thickness of the shoulder $d$, so that a bearing chamber $f$, remains between the front of the shoulder $d$, and the inner end of the hub, as shown. The front surface of the shoulder $d$, is made concave.

The main axle is provided with a socket or circular bearing chamber $g$, at each end, said sockets or chambers having oil passages $h$, chambers $h'$, and confining screws $i$, $i$, as shown. An external bearing $j$, is also formed on each end of the axle $c$, said bearing being convex at $k$, and conical at $l$, so as to fit exactly and snugly the bearing chamber $f$, of the hub. Accordingly as the diametre of the outer bearing is enlarged, the diameter of the bore of the socket or bearing chambers is increased as shown at $m$. It is by this particular and useful feature of my invention that the axle can be made stronger than usual at the shoulder, and with this increase of strength it has the main bearing $j$, also to assist it in resisting strain brought to bear upon it at the shoulder.

The auxiliary axle, hub and main axle are united together by a key $n$, screws $i$, $i$, and rings $o$, as shown.

Operation: As the wheels revolve, the short axles revolve with them, the rings $o$, and main-axle remaining stationary. In the revolution of the wheels the axles bear at $s$, $t$, and the hub at $j$, and consequently if strain is caused by lateral inclination of the wheels the bearing $j$, will relieve the axle at the shoulder, and thus prevent breaking or bending of the same. As the oil passes from the chambers $h'$, to the ends of the axle, its escape is retarded, or is concentrated by the peculiar convex shape given to said ends, and is consequently kept in use until its lubricating qualities are fully spent.

What I claim as my invention and desire to secure by Letters Patent, is

1. The peculiar manner of effecting a combination of the hub, short auxiliary axles, and intermediate stationary axle, whereby internal auxiliary bearings for the short axle and an external main-bearing for the hub, are provided, substantially as and for the purposes set forth.

2. Making the end of the main axle convex and the main bearing in the inner end of the hub concave, substantially as and for the purposes set forth.

The above specification of my impt. in hubs and axles signed by me this 23rd. day of December 1858.

DAVID BEARD.

Witnesses:
G. YORKE AT LEE,
H. H. YOUNG.